(12) United States Patent
Giraud et al.

(10) Patent No.: US 6,825,153 B2
(45) Date of Patent: Nov. 30, 2004

(54) LUBRICATING COMPOSITION BASED ON SILOXANE, NOT RELEASING HYDROGEN, PREPARATION METHOD AND USE THEREOF

(75) Inventors: Yves Giraud, Sainte Foy lès Lyon (FR); Gérald Guichard, Givors (FR); Ian Hawkins, Vaugneray (FR)

(73) Assignee: Rhodia Chimie, Boulogne Billancourt Cedex (FR)

( * ) Notice: Subject to any disclaimer, the term of this patent is extended or adjusted under 35 U.S.C. 154(b) by 0 days.

(21) Appl. No.: 10/148,563

(22) PCT Filed: Dec. 1, 2000

(86) PCT No.: PCT/FR00/03361
§ 371 (c)(1),
(2), (4) Date: Sep. 13, 2002

(87) PCT Pub. No.: WO01/40417
PCT Pub. Date: Jun. 7, 2001

(65) Prior Publication Data
US 2003/0114321 A1 Jun. 19, 2003

(30) Foreign Application Priority Data
Dec. 3, 1999 (FR) .......................................... 99 15290

(51) Int. Cl.⁷ .......................................... C10M 173/02
(52) U.S. Cl. ...................... 508/208; 508/204; 508/207; 508/211; 508/213; 106/38.22
(58) Field of Search ........................................ 508/208

(56) References Cited

U.S. PATENT DOCUMENTS

| | | | | |
|---|---|---|---|---|
| 3,756,052 A | * | 9/1973 | Quaal et al. ................... 72/42 |
| 4,359,340 A | * | 11/1982 | Comper et al. .......... 106/38.22 |
| 4,533,305 A | * | 8/1985 | Comper et al. ............... 425/43 |
| 4,618,645 A | * | 10/1986 | Bauman et al. ............. 524/745 |
| RE32,318 E | * | 12/1986 | Comper et al. .......... 106/38.22 |
| 4,636,407 A | * | 1/1987 | Comper et al. ............. 427/133 |
| 4,678,815 A | * | 7/1987 | Hoffman ..................... 523/122 |
| 4,840,742 A | * | 6/1989 | Hoffman ..................... 508/143 |
| 4,889,770 A | * | 12/1989 | Ona et al. ................... 428/447 |
| 5,073,608 A | * | 12/1991 | Ona et al. ................... 525/477 |
| 5,152,950 A | * | 10/1992 | Ona et al. ................... 264/315 |
| 5,431,832 A | * | 7/1995 | Crowe et al. ............... 508/208 |
| 5,746,945 A | * | 5/1998 | Ryklin et al. ................. 516/23 |
| 6,057,386 A | * | 5/2000 | Morita et al. ............... 523/212 |
| 6,388,005 B1 | * | 5/2002 | Morita et al. ............... 524/837 |
| 6,391,831 B1 | * | 5/2002 | Ebbrecht et al. ............ 508/126 |
| 6,423,303 B1 | * | 7/2002 | Ryklin et al. ................. 424/60 |
| 6,433,028 B1 | * | 8/2002 | Ebbrecht et al. ............ 516/118 |
| 6,451,863 B1 | * | 9/2002 | Ebbrecht et al. ............ 516/118 |
| 6,525,103 B2 | * | 2/2003 | Ebbrecht et al. ............ 516/118 |

FOREIGN PATENT DOCUMENTS

| | | |
|---|---|---|
| EP | 0 206 314 | 12/1986 |
| EP | 0 279 372 | 8/1988 |
| EP | 0 635 559 | 1/1995 |

* cited by examiner

Primary Examiner—Ellen M McAvoy
(74) Attorney, Agent, or Firm—Burns, Doane, Swecker & Mathis, L.L.P.

(57) ABSTRACT

The invention concerns a lubricating composition, in the form of an oil-in-water emulsion, based on siioxane and not releasing hydrogen comprising: (a) a polydiorganosiloxane oil non-reactive to the lubricating properties having a dynamic viscosity of the order of $5.10^{-2}$ to $30.10^2$ Pa.s at 25° C.; (b) a polyorganosiloxane resin bearing, before emulsification, condensable hydroxyl substituents and comprising before emulsification at least two syloxyl units selected among those of formula $(R_0)_3SiO_{1/2}(M)$; $(R_0)_2SiO_{2/2}(D)$; $R_0SiO_{3/2}(T)$ and $SiO_{4/2}(Q)$, one at least of said units being a T or Q unit, formulae wherein: $R_0$ represents a monovalent organic substituent, the average number per molecule of organic radicals $R_0$ for a silicon atom ranging between 1 and 2; and said resin having a weight content of hydroxyl substituents ranging between 0.1 and 10 wt. %, and, preferably between 0.2 and 5 wt. %; (c) a crosslinking agent soluble in the silicone phase comprising at least two functions capable of reacting with the polyorganosiloxane resin (b); a condensation catalyst capable of catalysing the reaction of constituent (b) with constituent (c); (e) a surfactant; and (f) water.

26 Claims, No Drawings

LUBRICATING COMPOSITION BASED ON SILOXANE, NOT RELEASING HYDROGEN, PREPARATION METHOD AND USE THEREOF

The invention relates to a lubricating composition which is particularly appropriate for lubricating curing bladders used during the shaping and curing of pneumatic or semipneumatic tires.

The invention also relates to the curing bladders coated with a lubricating composition according to the invention as well as the pneumatic or semipneumatic tires coated with said lubricating composition.

According to two other of its aspects, the invention relates to a process for preparing the lubricating compositions of the invention as well as the use of said lubricating compositions for lubricating curing bladders.

Rubber tires for vehicles are usually manufactured by molding and curing a raw, or uncured and unshaped, envelope in a molding press in which the raw envelope is pressed toward the outside against the surface of a mold by means of a bladder which can expand by means of an inner fluid. By this process, the raw envelope is shaped against the outer surface of the mold which defines the design of the tire tread of the envelope and the configuration of t sides. On heating, the envelope 's cured. In general, the bladder is expanded by the inner pressure provided by a fluid such as a hot gas, hot water and/or steam, which itself also participates in the heat transfer for the curing. The envelope is then allowed to cool a little in the mold, this cooling being sometimes promoted by the introduction of cold or cooler water into the bladder. The mold is then opened, the bladder is deflated by releasing the pressure of the inner fluid and the envelope is removed from the envelope mold. This use of bladders for curing envelopes is well known in the art.

It is accepted that a notable relative movement occurs between the outer surface of contact of the bladder and the inner surface of the envelope during the bladder expansion phase before complete curing of the envelope. Likewise, a considerable relative movement also occurs between the outer surface of contact of the bladder and the cured inner surface of the envelope, after the envelope has been molded and cured, during the deflation and the extraction of the bladder from the pneumatic tire.

If adequate lubrication is not provided between the bladder and the inner surface of the envelope, the bladder generally tends to get warped, which causes deformation of the envelope in the mold and also excessive wear and depolishing of the surface of the bladder itself. The surface of the bladder also tends to stick to the inner surface of the envelope after curing of the envelope and during the part of the envelope curing cycle in which the bladder is deflated. In addition, air bubbles may be trapped between the surfaces of the bladder and of the envelope and may promote the appearance of envelope curing defects resulting from inadequate heat transfer.

For this reason, the outer surface of the bladder or the inner surface of the raw or uncured envelope is coated with an appropriate lubricant, sometimes called by the name "lining cement".

Numerous lubricating compositions have been provided to this effect in the art.

Lubricating compositions described in FR 2 494 294 are known in particular which contain, as main constituents, a reactive polydimethylsiloxane preferably having terminal hydroxyl groups, a crosslinking agent, preferably comprising Si—H functional groups and optionally a polycondensation catalyst.

Examples of crosslinking agent with Si—H functional group(s) are methylhydrogensilane, dimethylhydrogensilane and polymethylhydrogenslane. The disadvantage of lubricating compositions of this type is their instability during storage. Indeed, creaming of the emulsion following the emission of hydrogen during transport and the preservation of the lubricating composition is observed. The emission of hydrogen, which is responsible for the instability of the compositions of the prior art, essentially results from the decomposition of the constituents with Si—H functional group(s).

The preparation of lubricating compositions from constituents not containing the Si—H functional group, and having nevertheless excellent properties of durability, lubrication and elasticity is therefore highly desirable.

The compositions forming the subject of EP 635 559 are lubricating compositions based on siloxane which partly meet these requirements. These compositions are in particular stable in that they do not emit hydrogen during storage.

These compositions, which exist in the form of emulsions, comprise as essential constituents, a nonreactive polydimethylsiloxane, a reactive polydimethylsiloxane, preferably with a hydroxyl or alkoxy terminus and a crosslinking agent. Their durability is however insufficient for practical use in the production of pneumatic or semipneumatic tires.

The present invention provides an improved lubricating composition which does not emit hydrogen and which moreover exhibits excellent sliding and durability characteristics, which makes them perfectly appropriate for lubricating the bladders used during the curing of pneumatic and semipneumatic tires.

The lubricating composition of the invention is an oil-in-water emulsion, based on siloxane which does not emit hydrogen. This composition comprises more precisely:

(a) a polydiorganosiloxane oil which is nonreactive to the lubricating properties, having a dynamic viscosity of the order of $5 \times 10^{-2}$ to $30 \times 10^{2}$ Pa.s at 25° C.;

(b) a polyorganosiloxane resin carrying, before emulsification, condensable hydroxyl substituents and containing, before emulsification, at least two different siloxyl units chosen from those of formula $(R_O)_3SiO_{1/2}$ (M); $(R_O)_2SiO_{2/2}$(D); $R_OSiO_{3/2}$(T) and $SiO_{4/2}$(O), at least one of these units being a T or Q unit, in which formulae $R_O$ represents a monovalent organic substituent, the average number per molecule of organic radicals $R_O$ for a silicon atom being between 1 and 2; and said resin having a weight content of hydroxyl substituents of between 0.1 and 10% by weight, and, preferably between 0.2 and 5% by weight;

(c) a crosslinking agent which is soluble in the silicone phase, comprising at least two functional groups capable of reacting with the polyorganosiloxane resin (b);

(d) a condensation catalyst capable of catalyzing the reaction of constituent (b) with constituent (c);

(e) a surfactant; and (f) water, said composition comprising
   from 5 to 95 parts by weight of constituent (a);
   from 0.5 to 50 parts by weight of constituent (b);
   from 0.1 to 20 parts by weight of constituent (c);
   from 0.05 to 10 parts by weight of constituent (d);
   per 100 parts by weight of the sum of constituents (a)+(b)+(c)+(d);

the quantities of surfactants and water being sufficient to obtain an oil-in-water emulsion.

The constituents (a), (b), (c), (d) and (e) of the emulsion are defined with reference to their initial chemical structure, that is to say the structure which characterizes them before emulsification. As soon as they are in aqueous medium, their structure is likely to be greatly modified following hydrolysis and condensation reactions.

The expression dynamic viscosity is understood to mean, in the context of the invention, the Newtonian-type viscosity, that is to say the dynamic viscosity measured in a manner known per se at given temperature, at a gradient of shear rate which is sufficiently low for the measured viscosity to be independent of the rate gradient.

The nonreactive polydiorganosiloxane oil (a) has a dynamic viscosity which is generally between $5 \times 10^{-2}$ and $30 \times 10^2$ Pa.s at 25° C. Preferably, the dynamic viscosity varies between $5 \times 10^2$ and 30 Pa.s, better still between 0.1 and 5 Pa.s.

In the context of the invention, the expression "nonreactive" is understood to mean an oil which, under the conditions for emulsification, preparation of the lubricating composition and use, does not chemically react with any of the components of the composition.

As preferred constituent (a), there may be mentioned linear polydiorganosiloxanes with a recurring unit of formula $V_1V_2SiO_{2/2}$, terminated at its chain ends by $V_3V_4V_5SiO_{1/2}$ units, $V_1$, $V_2$, $V_3$, $V_4$ and $V_5$, which are identical or different, representing a monovalent organic group chosen from alkyl, alkenyl, aryl, cycloalkyl, cycloalkenyl, aralkyl or alkaryl.

In these oils, alkyl denotes a linear or branched saturated hydrocarbon group, preferably a $C_1$–$C_6$ (such as methyl, ethyl and propyl); alkenyl denotes a linear or branched ethylenicallyu unsaturated hydrocarbon group, preferably a $C_2$–$C_8$ (such as vinyl, allyl and butadienyl); aryl denotes a hydrocarbon-based mono- or polycyclic aromatic group, preferably as $C_6$–$C_{10}$ (such as phenyl or naphthyl); cycloalkyl denotes a mono- or polycyclic saturated carbocyclic group, preferably as $C_3$–$C_8$ (such as cyclohexyl); cycloalkenyl denotes a cycloalkyl group having one or more unsaturations, preferably as $C_6$–$C_8$ (such as cyclohexenyl); aralkyl denotes for example benzyl; alkaryl denotes for example tolyl or xylyl. More generally, alkaryl and aralkyl denote groups in which the aryl and alkyl portions are as defined above.

Advantageously, the substituents $V_1$, $V_2$, $V_3$, $V_4$ and $V_5$ are identical to each other.

Preferably, the constituent (a) is a linear, nonfunctionalized polydimethylsiloxane, that is to say with recurring units of formula $(CH_3)_2SiO_{2/2}$ and having $(CH_3)_3SiO_{12}$ units at its two ends.

The constituent (a) is generally introduced into the composition in an amount of 5 to 95 parts by weight per 100 parts by weight of the mixture of constituents (a)+(b)+(c)+(d), preferably in an amount of from 50 to 95, better still in an amount of 75 to 95.

The constituent (b) is a polyorganosiloxane resin carrying, before emulsification, condensable hydroxyl groups.

In the constituent units of these resins, each substituent $R_0$ rep-resents a monovalent organic group.

In general, $R_0$ is a $C_1$–$C_{20}$ hydrocarbon radical optionally carrying one or more substituents.

Examples of hydrocarbon radicals are a linear or branched saturated or unsaturated, aliphatic group preferably having from 1 to 10 carbon atoms; a saturated, unsaturated or aromatic, monocyclic or polycyclic, carbocyclic group preferably having from 3 to 18 carbon atoms, better still from 5 to 10 carbon atoms; or a radical having an aliphatic part as defined above and a carbocyclic part as defined above.

The substituents of the hydrocarbon radical may be —OR' or —O—CO—R' groups in which R' is an unsubstituted hydrocarbon radical as defined above.

Other substituents of the hydrocarbon radical may be groups containing amines, amides, epoxides or a ureido functional group.

By way of example of substituents of the hydrocarbon radical, there may be included amine-containing functional groups of the type:

—$R_a$—$NR_1R_2$ in which
  $R_a$ represents nothing or represents a saturated or unsaturated, linear or branched divalent $C_1$–$C_{20}$, preferably $C_1$–$C_{10}$, aliphatic hydrocarbon radical, and for example ($C_1$–$C_{10}$)alkylene;
  and $R_1$ and $R_2$ independently represent H; a ($C_1$–$C_{20}$) alkyl, preferably ($C_1$–$C_{10}$)alkyl, group; a ($C_3$–$C_8$) cycloalkyl group; or a ($C_6$–$C_{10}$)aryl, preferably phenyl, group;

—$R_b$—NH—$R_c$—$NR_1R_2$ in which $R_b$ and $R_c$, which are identical or different, are as defined for $R_a$ above; and $R_1$ and $R_2$ are as defined above;

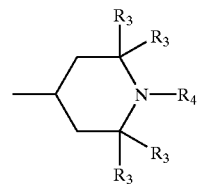

in which $R_3$ represents $C_1$–$C_{20}$ alkyl, better still ($C_1$–$C_{10}$) alkyl, for example ($C_1$–$C_3$)alkyl and in particular methyl; ($C_6$–$C_{20}$) aryl, better still ($C_6$–$C_{10}$)aryl, for example phenyl; or arylalkyl in which the aryl and alkyl portions are as defined above;

$R_4$ represents a hydrogen atom; $C_1$–$C_{20}$ alkyl, better still ($C_1$–$C_{12}$)alkyl, for example methyl; $C_2$–$C_{21}$ alkylcarbonyl, better still ($C_2$–$C_{13}$)alkylcarbonyl; ($C_6$–$C_{20}$) aryl, better still ($C_6$–$C_{10}$)aryl, for example phenyl; or arylalkyl and preferably ($C_6$–$C_{10}$)aryl-($C_1$–$C_{12}$)alkyl; or alternatively $R_4$ represents O; and

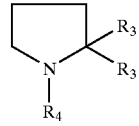

in which $R_3$ and $R_4$ are as defined above.

Arylalkyl is preferably benzyl.

It is however preferable that the concentration of —OR', —O—CO—R', amine, amide, epoxide or ureido groups, when they are present in the resin, is limited so as not to exceed the tolerance threshold above which the stability of the emulsion would be compromised.

The silicone resins (b) are well known branched organopolysiloxane polymers whose methods of preparation are described in numerous patents. As concrete examples of resins which can be used, there may be mentioned the hydroxylated resins MQ, MDQ, DQ, ST and MDT and mixtures thereof. In these resins, each OH group is carried by a silicon atom belonging to an X, D or T unit.

Preferably, as examples of resins which can be used, there may be mentioned the hydroxylated organopolysiloxane resins not comprising a Q unit in their structure. More preferably, there may be mentioned the hydroxylated resins DT and MDT comprising at least 20% by weight of T units and having a weight content of hydroxyl group ranging from 0.1 to 10%, and even better from 0.2 to 5%. In this group of more preferred resins, those in which the average number of substituents $R_0$ for a silicon atom is, per molecule, between 1.2 and 1.8, are more particularly suitable. Still more advantageously, resins of this type are used, in whose structure at least 80% in numerical terms of the substituents $R_0$ are methyl radicals.

The resin (b) is liquid at room temperature. Preferably, the resin has a dynamic viscosity at 25° C. of between 0.2 and 200 Pa.s.

The resin is incorporated into the lubricating composition in an amount of from 0.5 to 50 parts by weight per hundred parts by weight of the sum of the constituents (a), (b), (c) and (d), preferably in an amount of 3 to 30, even better from 5 to 15 parts by weight.

The crosslinking agent (c) which is soluble in the silicone phase comprises at least two functional groups capable of reacting with the resin (b) so as to cause crosslinking of said resin. Advantageously, said reactive functional groups of the crosslinking agent (c) react with the resin (b) under the conditions for preparing the emulsion.

The crosslinking agent (c) preferably has the formula:

$$Y_a Si(Zi)_{4-a}$$

in which:

a is 1 or 2;

Y is a monovalent organic group; and the groups Zi, which are identical or different, are chosen from —OX.;

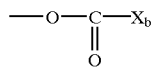

and —O—N=$CX_1X_2$ in which $X_a$, $X_b$, $X_1$ and $X_2$ are independently saturated or unsaturated, linear or branched, aliphatic hydrocarbon radicals, preferably a $C_1$—$C_{20}$ (for example a $C_1$–$C_{10}$); it being understood that $X_1$ and $X_2$ may in addition represent hydrogen and that $X_a$ is a radical optionally substituted with ($C_1$–$C_{10}$)alkoxy.

According to a preferred embodiment of the invention, a represents 1, such that the crosslinking agent (c) has the formula: $YSi(Zi)_3$.

Preferably still, the Zi groups are identical to each other.

A preferred group of crosslinking agent (c) is formed by all the organotrialkoxysilanes, organotriacyloxysilanes, organotrioximosilanes and tetraalkyl silicates.

More generally, as regards the symbol Y, the expression "monovalent organic group" encompasses in particular saturated or unsaturated, linear or branched $C_1$–$C_{30}$ aliphatic radicals; saturated, unsaturated or aromatic, mono- or polycyclic $C_6$–$C_{30}$ carbocyclic radicals; as well as radicals having both an aliphatic portion as defined above and a carbocyclic portion as defined above; each s: these radicals being optionally substituted with an amino, epoxy, thiol or ester functional group.

Examples of groups Y are more particularly the ($C_1$–$C_{10}$) alkyl, ($C_1$–$C_{10}$)alkoxy or ($C_2$–$C_{10}$)alkenyl radicals, optionally substituted with a group:

epoxy;

thiol;

($C_3$–$C_8$)cycloalkyl optionally substituted with epoxy;

($C_1$–$C_{10}$)alkylcarbonyloxy optionally substituted with epoxy;

($C_2$–$C_{10}$)alkenylcarbonyloxy optionally substituted with epoxy;

($C_3$–$C_8$)cycloalkylcarbonyloxy optionally substituted with epoxy;

($C_6$–$C_{10}$)arylcarbonyloxy;

—$R_a$—$NR_1R_2$ where $R_a$, $R_1$ and $R_2$ are as defined above;

—$R_b$—NH—$R_c$—$NR_1R_2$ where $R_a$, $R_b$, $R_1$ and $R_2$ are as defined above;

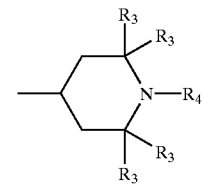

in which $R_3$ and $R_4$ are as defined above;

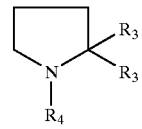

It is preferable that $R_3$ represents methyl, phenyl or benzyl and $R_4$ represents H or methyl.

Still more preferably, Y is unsubstituted ($C_2$–$C_{10}$)alkenyl; or alternatively ($C_1$–$C_{10}$)alkyl optionally substituted with a group chosen from:

thiol;

($C_1$–$C_{10}$)alkylcarbonyloxy optionally substituted with epoxy;

($C_3$–$C_8$)cycloalkyl optionally substituted with epoxy;

($C_2$–$C_{10}$)alkenylcarbonyloxy; and

—$R_a$—$NR_1R_2$ where $R_a$ represents nothing or represents ($C_1$–$C_6$)alkylene and $R_1$, $R_2$ independently represent H, ($C_3$–$C_8$)cycloalkyl or ($C_6$–$C_{10}$)aryl and in particular phenyl.

By way of example, Y represents aminopropyl, ethylaminopropyl, n-butylaminoethyl, cyclohexylaminopropyl, phenylaminoethyl, N-aminoethylaminopropyl, dimethylaminopropyl, glycidyloxypropyl, 3,4-epoxycyclohexylethyl, mercaptopropyl, methacryloxypropyl, methyl, ethyl or vinyl.

The groups Zi are advantageously chosen from ($C_1$–$C_{10}$) alkoxy; ($C_1$–$C_{10}$)alkoxy-($C_1$–$C_{10}$)alkoxy; ($C_1$–$C_{10}$) alkylcarbonyloxy; or an ox-me group —O—N=$CX_1X_2$ in which $X_1$ and $X_2$ are independently H or ($C_1$–$C_{10}$)alkyl.

Preferably, Zi represents methoxy, ethoxy, propoxy, methoxyethoxy, acetoxy or an oxime group.

A particularly preferred group of constituents (c) is formed by alkyltrialkoxysilanes of formula $YSi(Zi)_3$ in which Y is alkyl, in particular ($C_1$–$C_{30}$)alkyl (preferably ($C_1$–$C_{10}$)alkyl) and Zi is alkoxy, in particular ($C_1$–$C_{20}$) alkoxy, preferably ($C_1$–$C_{10}$) alkoxy.

Among these, there may be mentioned methyltrimethoxysilane and methyltriethoxysilane.

Other appropriate crosslinking agents (c) are described in U.S. Pat. No. 4,889,770, such as:

beta-aminoethyltrimethoxysilane, beta-aminoethyltriethoxysilane, beta-aminoethyltriisopropoxysilane,
gamma-aminopropyltrimethoxysilane,
gamma-aminopropyltriethoxysilane
gamma-aminopropyltri(n-propoxy) silane,
gamma-aminopropyl(n-butoxy)silane,
delta-aminobutyltrimethoxysilane,
epsilon-aminohexyltriethoxysilane,
4-aminocyclohexyltriethoxysilane,
A-aminophenyltrimethoxysilane,
N-aminoethyl-gamma-aminopropyltrimethoxysilane,
N-aminoethyl-gamma-aminopropyltriethoxysilane,
beta-glycidoxyethyltrimethoxysilane,
beta-glycidoxyethyltriethoxysilane,
gamma-glycidoxypropyltriethoxysilane,
beta-(3,4-epoxycyclohexyl)ethyltrimethoxy-silane,
beta-(3,3-epoxycyclohexyl)ethyltriethoxy-silane,
gamma-(3,4-epoxycyclohexyl)propyltriethoxy-silane,
gamma-mercaptopropyltrimethoxysilane,
gamma-mercaptopropyltriethoxysilane,
gamma-methacryloxypropyltrimethoxysilane,
gamma-methacryloxypropyltriethoxysilane,
methyltrimethoxysilane,
ethyltriethoxysilane,
vinyltrimethoxysilane,
allyltrimethoxysilane,
and the corresponding compounds in which the alkoxy groups have been replaced by alkylcarbonyloxy or oxime groups.

The lubricating composition comprises from 0.1 to 20 parts by weight, per one hundred parts by weight of the sum of the constituents (a)+(b)+(c)+(d), of the crosslinking agent (c), Preferably from 0.2 to 10 parts by weight, even better from 0.5 to 5.

The condensation catalyst (d) is chosen from those conventionally used in the art to catalyze the crosslinking of resins of the (b) type using crosslinking agents of the (c) type which are defined above.

Examples of catalysts which can be used in the context of the invention are organometallic salts, and titanates such as tetrabutyl orthotitanate. As organometallic salt, there may be mentioned zirconium naphthenate and zirconium octylate.

Said catalyst is preferably a tin-containing catalytic compound, generally an organotin salt.

The organotin salts which can be used are described in particular in the manual by NOLL, Chemistry and Technology of Silicones, Academic Press (1968), page 337. It is also possible to define as tin-containing catalytic compound either distannoxanes, or polyorganostannoxanes, or the product of the reaction of a tin salt, in particular of a tin dicarboxylate, with polyethyl silicate, as described in patent U.S. Pat. No. 3,862,919.

The product of the reaction of an alkyl silicate or of an alkyltrialkoxysilane with dibutyltin diacetate as described in Belgian patent BE 842 305, may also be suitable.

According to another possibility, a tin II salt, such as $SnCl_2$ or stannous octoate, is used.

Advantageously, the catalyst is the tin salt of an organic acid, such as dibutyltin diacetate, dibutyltin dilaurate, dioctytin dilaurate, dibutyltin dioctate, zinc naphthenate, cobalt naphthenate, zinc octylate, cobalt octylate and dioctyltin di(iso-mercaptoacetate).

The preferred tin salts are tin bischelates (EP 147 323 and EP 235 049), diorganotin dicarboxylates and, in particular, dibutyl- or dioctyltin diversatates (British patent GB 1 289 900, dibutyl- or dioctyltin diacetate, dibutyl- or dioctyltin dilaurate or the products of hydrolysis of the precipitated species (for example diorgano and polystannoxanes).

The catalyst (d) is generally introduced into the lubricating composition in an amount of 0.05 to 10 parts by weight, per one hundred parts by weight of the sum of the constituents (a)+(b)+(c)+(d) preferably in an amount of 0.08 to 5 parts by weight, and better still from 0.1 to 2 parts by weight.

Dioctyltin dilaurate is most particularly preferred.

The nature of surfactant (e) will be easily determined by persons skilled in the art, the objective being to prepare a stable emulsion.

The anionic, cationic, nonionic and zwitterionic surfactants may be used alone or as a mixture.

As anionic surfactant, there may be mentioned the alkali metal salts of sulfonic aromatic hydrocarbon-containing acids or the alkali metal salts of alkylsulfuric acids.

The nonionic surfactants are more particularly preferred in the context of the invention. Among them, there may be mentioned alkyl or aryl ethers of poly(alkylene oxide), polyoxyethylenated sorbitan hexastearate, polyoxyethylenated sorbitan oleate having a saponification value of 102 to 108 and a hydroxyl value of 25 to 35 and the ethers of cetylstearyl and of poly(ethylene oxide).

As acrylic ether of poly(alkylene oxide), there may be mentioned polyoxyethylenated alkylphenols. As alkyl ether of poly(alkylene oxide), there may be mentioned isodecyl ether of polyethylene glycol and trimethylnonyl ether of polyethylene glycol containing from 3 to 15 ethylene oxide units per molecule.

The quantity of surfactant (e) depends on the type of each of the constituents present as well as on the actual nature of the surfactant used. As a general rule, the composition comprises from 0.5 to 10% by weight of surfactant (better still from 0.5 to 5% by weight) and from 40 to 95% by weight of water (better still from 45 to 90% by weight).

Advantageously, the lubricating composition of the invention may comprise, in addition, a water-soluble crosslinklng agent (g) chosen from hydroxylated silanes and/or polydiorganosiloxanes, said crosslinking agent carrying, per molecule, at least one organic group with an Fr functional group, Fr representing an optionally substituted amino functional group, an epoxy, optionally substituted acroyl ($CH_2$=CH—CO), optionally substituted methacroyl (—$CH_2$=C($CH_3$)—CO—), optionally substituted ureido ($NH_2$—CO—NH—), optionally substituted thiol or halogen functional group.

For the purposes of the present invention, the expression water solubility should be understood to mean the capacity of a product to dissolve in water at a temperature of 25° C., in an amount of at least 5% by weight.

The organic substituents of the crosslinking agent (g) other than the organic group(s) with an Fr functional group are saturated or unsaturated, linear or branched, aliphatic radicals preferably having from 1 to 10 carbon atoms; saturated, unsaturated or aromatic, monocyclic or polycyclic, carbocyclic radicals preferably having from 3 to 18 carbon atoms, better still from 5 to 10 carbon atoms; or radicals having both an aliphatic portion and a carbocyclic portion.

According to a preferred embodiment of the invention, Fr is an amine-containing functional group.

Thus, a preferred organic group with an Fr functional group is a group of formula —$R_a$—$NR_1R_2$; —$R_b$—NH—$R_c$—$NR_1R_2$;

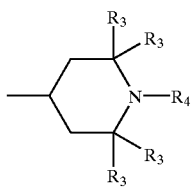

and

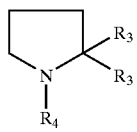

where $R_a$, $R_b$, $R_c$, $R_1$, $R_2$, $R_3$ and $R_4$ are as defined above.

According to a preferred embodiment of the invention, the water-soluble crosslinking agent has the formula:

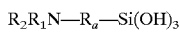

in which $R_a$, $R_1$ and $R_2$ are as defined above. More preferably, $R_a$ represents alkylene, in particular ($C_1$–$C_6$) alkylene, and $R_1$ and $R_2$ independently represent a hydrogen atom or an alkyl, in particular ($C_1$–$C_6$)alkyl, group.

By way of example, 3-aminopropyltrihydroxy-silane may be mentioned.

The water-soluble crosslinking agent may be a linear and/or cyclic hydroxylated polydiorganosiloxane containing MD and/or D siloxyl units, and/or a hydroxylated polydiorganosiloxane resin having, in its structure, siloxyl units T optionally combined with units M and/or D and/or Q, or alternatively siloxyl units Q combined with M and/or D units.

This linear, cyclic or crosslinked polydiorganosiloxane is not substituted with hydrolyzable organic functional groups such as alkoxy functional groups.

In these polydiorganosiloxanes, the siloxyl units M, D, T and Q are defined as follows:

M, unit=$G_3SiO_{1/2}$

D unit=$G_2SiO_{1/2}$

T unit=$GSiO_{3/2}$

Q unit=$SiO_{4/2}$,

G being an organic substituent as defined above for the crosslinking agent (g), or alternatively representing hydroxyl or alternatively being an For functional group, it being understood that in each molecular structure, at least one of the symbols G represents a hydroxyl group and at least another of the symbols G represents an Fr functional group.

Preferably, G is alkyl, in particular ($C_1$–$C_6$)-alkyl (for example methyl, ethyl, isopropyl, tert-butyl and n-hexyl), hydroxyl, alkenyl (for example vinyl or allyl) or alternatively an Fr functional group, the preferred Fr functional groups being as defined above.

As linear hydroxylated polydiorganosiloxane which can be used as crosslinking agent (g), there may be mentioned polymethylsiloxane the two ends of which contain a hydroxyl and therefore each silicon atom of the chain carries an Fr functional group.

This constituent (g), when it is present in the lubricating composition, is used in an amount of 0.5 to 15 parts by weight per one hundred parts by weight of the sum or the constituents (a)+(b)+(c)+(d)+(g), preferably in an amount of 0.6 to 5 parts by weight, and even better from 0.8 to 3 parts by weight.

The presence of the crosslinking agent (g) improves in particular the durability of the lubricating composition.

In addition, the composition of the invention may further comprise (h) a reactive linear polydiorganosiloxane oil having at least two OH groups per molecule, having a dynamic viscosity at 25° C. generally of between $5 \times 10^{-2}$ and $30 \times 10^2$ Pa.s.

In the context of the invention, the term "reactive" denotes the reactivity of the constituent (h) toward the crosslinking agents (c) and/or (g) present in the composition.

Preferably, the component (h) reacts with the crosslinking agent under the conditions for preparing the emulsion.

The organic substituents of the oil (h) are generally as defined above in the case of the crosslinklng agent (g) (aliphatic and/or carbocyclic groups) and are optionally substituted with —OH and/or amino (optionally substituted) and/or halogen and/or cyano radicals. The substituent of the amino group may be an aliphatic radical, a carbocyclic radical, or may comprise both an aliphatic portion and a carbocyclic portion, the aliphatic and carbocyclic radicals being as defined above.

As halogen, here may be mentioned chlorine, fluorine, bromine or iodine, fluorine being more specifically appropriate.

Advantageously, the organic groups of the oil (h) are preferably $C_1$–$C_6$ alkyl groups; preferably $C_3$–$C_8$ cycloalkyl groups, preferably $C_6$–$C_{10}$ aryl groups (for example phenyl); or $C_2$–$C_6$ alkenyl groups (for example allyl or vinyl); said groups being optionally substituted with hydroxyl and/or amino (optionally substituted), and/or halo, and/or cyano.

The substituents of the amino group are, for example, alkyl, such as ($C_1$–$C_{10}$)alkyl; alkenyl, such as ($C_2$–$C_8$) alkenyl; aryl, such as ($C_6$–$C_{10}$)aryl; cycloalkyl, such as ($C_3$–$C_8$)cycloalkyl.

A preferred group of components (h) consists of the oils of formula:

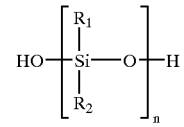

in which n is an integer greater than or equal to 10, $R_1$ and $R_2$, which are identical or different, represent —OH; alkyl, in particular ($C_1$–$C_6$)alkyl; cycloalkyl, in particular ($C_3$–$C_8$) cycloalkyl; alkenyl, in particular ($C_2$–$C_6$)alkenyl; cycloalkenyl, in particular ($C_5$–$C_8$)cycloalkenyl; or amino.

Preferably, $R_1$ and $R_2$ are independently chosen from ($C_1$–$C_6$) alkyl (such as methyl); ($C_6$–$C_{10}$)aryl, and for example phenyl; ($C_2$–$C_8$) alkenyl (such as vinyl) or alternatively amino; ($C_1$–$C_6$)alkylamino; or di($C_1$–$C_6$)-alkylamino; each of the alkyl and aryl groups being optionally substituted with halo (and preferably fluoro) or cyano.

The oils (h) most widely used, because of their availability in industrial products, are those for which $R_1$ and $R_2$ are independently chosen from methyl, ethyl, propyl, phenyl, vinyl and 3,3,3-tri-fluoropropyl. Preferably, 80% in numerical terms of these radicals are methyl radicals.

In practice, α,ω-dihydroxypolydimethyl-siloxanes carrying $(CH_3)_2(OH)SiO_{1/2}$ units at the ends will be preferred as oil (h).

In the context of the present invention, there may be especially used the the α,ω-dihydroxy-polydiorganosiloxanes prepared by the anionic polymerization method described in the above-mentioned American patents: U.S. Pat. No. 2,891,920 and especially U.S. Pat. No. 3,294,725 (cited as reference).

The constituent (h), when it is present, is used in an amount from 0.5 to 30% by weight, and preferably from 1 to 10% by weight, relative to the total weight of the composition.

The lubricating composition according to the present invention may also contain one or more additional ingredients such as film-forming polymers, additional lubricants and anti-friction agents, coalescing agents, wetting or dispersing agents, air evacuating agents, antifoaming agents, thickeners, stabilizers, preservatives such as biocides, antifungal agents in quantities which may vary considerably, for example, between 0.2 and 50% by weight of the composition.

By way of film-forming agent, styrene-acrylic copolymers may be mentioned for example.

Examples of thickeners are cellulosic thickeners (carboxymethylcellulose), acrylic thickeners, polyurethane, hydrocolloidal gums (xanthan gum) and mixtures thereof.

As coalescing agent, glycols and/or aliphatic petroleum cuts (petroleum distillation fractions) may be used.

Wetting or dispersing agents which can be used in the context of the invention are, for example, phosphates and/or polyacrylics, such as for example sodium hexametaphosphate and sodium polyacrylates.

The compositions of the invention may be prepared in a conventional manner using conventional state of the art methods.

A first method consists in emulsifying, in an aqueous phase comprising all the water-soluble constituents, a mixture of the lipophilic constituents (a), (b), (c), (d) and optionally (h), in the presence of the surfactant (e).

Modifications to method can naturally be envisaged. An oil-in-water preemulsion may first of all be prepared from only a few of the constituents forming the final composition. The missing constituents may then be added, either directly to the emulsion (the case for water-soluble constituents), or subsequently in the form of an emulsion (the case for constituents soluble in the silicone phase).

Thus, the catalyst (d), the film-forming polymer and the reactive oil (h) may be added, either directly to the silicone phase before emulsification or after formation of the preemulsion, in the form of an additional emulsion.

The emulsification may be direct or may proceed by inversion.

In the case where the procedure is by inversion, it may be advantageous to prepare a preemulsion containing only a small proportion of water, to carry out its inversion (for example by grinding), and then dilute the resulting emulsion with the remaining water, optionally supplemented with one or more water-soluble constituents.

A preferred variant consists in particular in preparing an oil-in-water preemulsion comprising all the constituents (a), (b) and (c) and optionally (g) in the presence of the surfactant (e) before adding to this preemulsion the missing constituents in the form of additional emulsion(s)

Thus, according to another of its aspects, the invention relates to a method for preparing a lubricating composition according to the invention, comprising the steps consisting in:

α—emulsifying in water (f), a mixture of nonreactive polydiorganosiloxane oil (a), polyorganosiloxane resin (b), and crosslinking agent which is soluble in the silicone phase (c), in the presence or the surfactant (e) so as to prepare an oil-in-water type emulsion;

β—adding to the preceding emulsion, an emulsion of the catalyst (d) in water.

Normally, the method of the invention is carried out at room temperature.

The emulsification, in step α, may be direct or may proceed by inversion. The procedure is preferably carried out by inversion.

When a water-soluble crosslinking agent (g) is incorporated into the lubricating composition, it is preferably incorporated, in the form of an aqueous solution, at the end of step β, into an oil-in-water preemulsion containing all the constituents (a), (b), (c) and (e).

When a reactive linear polydiorganosiloxane oil (h) is present, it is preferably added to the oil-in-water emulsion at the end of step in the form of an oil-in-water preemulsion.

The additional emulsion of the catalyst (d) as well as any emulsion added to the preemulsion resulting from step (a) is preferably prepared in the presence of the same surfactant as step α. However, it is possible to envisage the use of any other type of surfactant, such as for example a poly(vinyl alcohol). The latter surfactant is most particularly useful in the case where it is desired to prepare an additional emulsion of a tin-based catalyst.

The method of the invention may comprise, in addition, an additional step of heating the resulting emulsion. This step makes it possible to accelerate the crosslinking processes. It can be replaced by a step of storing the emulsion at room temperature until complete crosslinking is obtained.

The lubricating properties of the composition of the invention are markedly enhanced in the event of complete crosslinking of the crosslinkable constituents of the composition.

The oils and resins (a), (b) and (h) as well as the crosslinking agents (c) and (g) are commercially available or are easily accessible to a person skilled in the art using conventional methods described in the prior art.

When the resin (b) or the crosslinking agent (c) are functionalized, the functionalization is easily carried out by appropriate substitution or addition reaction.

When the optional constituent (g) represents a hydroxylated water-soluble silicone resin, the latter may be obtained:

by cohydrolysis:

of at least one silane ($S_1$) substituted with Fr functional groups or with Hydrolyzable Organic Functional Substituents (Sofh) which are mutually identical or different, preferably —$OR_d$ with $R_d$=hydro-carbon, advantageously alkyl, radical;

with at least one silane ($S_2$) substituted with Sofh substituents which are identical or different with respect to each other and relative to those of ($S_1$), excluding Fr substituents;

by heterocondensation of the hydrolysates derived from the $S_1$ and $S_2$ silanes;

and then by "stripping" or steam distillation of the hydrolysates derived from the Sofh substituents.

For the purposes of the invention, the hydrolyzable organofunctional substituents (Sofh), which are capable of generating in situ volatile organic compounds (VOC) during crosslinking by condensation, are for example alkoxy, acetoxy, cetiminoxy and enoxy substituents.

Since the most common Sofh substituents are alkoxyls —$OR_d$, the mechanisms of heterocondensation involved are of the OH/OH and OH-/OFT type, these OH or $OR_d$ being carried by the hydrolysates derived from the silanes $S_1$ and $S_2$. The hydrolysates derived from the Sofh substituents are, for their part, alcohols, in this instance.

Thus, in practice, the silane $S_1$ is advantageously a trialkoxysilane, preferably a trimethoxysilane, a triethoxysilane, a methyldimethoxy-silane or a methyldiethoxysilane, carrying an amine-containing functional group Fr of the type:

3-aminopropyl;

N-methyl-3-aminopropyl;

N-aminoethyl-3-aminopropyl;

$C_6H_5CH_2NH(CH_2)_2NH$—$(CH_2)_3$—;

3-ureidopropyl;

3-(4,5-dihydroimidazol-1-yl)propyl;

3-methacryloxypropyl: $CH_2$=$C(CH_3)$—COO—$(CH_2)_3$—;

3-glycidyloxypropyl:

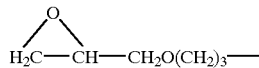

(the other substituents of Si in the crosslinking agent (g) being in this case free of Sofh)

3-mercaptopropyl;

3-chloropropyl.

As regards $S_2$, the Sofh substituents which it comprises are preferably advantageously $C_1$–$C_6$ alkoxy radicals, for example: methoxy, ethoxy or propoxy.

This silane $S_2$, preferably an alkoxysilane, may also contain at least one advantageously $C_1$–$C_6$ alkyl substituent, for example: methyl, ethyl, propyl.

These resins, which are produced by heterocondensation of $S_1$ and $S_2$, are described in particular in European patent application No. 0 675 128, whose content is integrated by reference into the present disclosure.

According to a second embodiment, the optional crosslinking agent (g) is a resin obtained:

by hydrolysis of a silane $S_3$ substituted with Fr groups and Sofh substituents, by homocondensation of the hydrolyzed silanes $S_3$, and by "stripping" or steam distillation of the hydrolysates derived from Sofh substituents.

The silane $S_3$ is preferably an Fr substituted alkoxysilane. It may be for example a trialkoxysilane which makes it possible to obtain a hydroxylated resin with T units, also called T(OH) resin.

This $S_3$ silane may be of the same type as the $S_1$ silane as defined above. The Fr functional groups substituting $S_3$ correspond to the same definition as that given above.

As illustration of this second embodiment of a crosslinking agent (g) of the polydiorganosiloxane resin type, there may be mentioned that obtained from γ-aminopropyltriethoxysilane which is hydrolyzed and subjected to "stripping" of the ethanol Formed by the hydrolysis. The polyhomocondensed resin obtained is a mixture of oligomers containing from 4 to 10 silicone and comprising units:

T(OH)=R"Si(OH)$O_{2/2}$

T=R"Si$O_{3/2}$

T(OH)$_2$=R"Si(OH)$_2$$O_{1/2}$

T(OH)$_3$=R"Si(OH)$_3$, these units being respectively present in decreasing quantity, with R"=$NH_2$—$(CH_2)$—$_3$. It is for example an amine-containing resin T(OH).

According to a variant of the invention, the temperature may be increased up to 40° C. so as to accelerate the crosslinking of the constituents present.

The present invention also relates to the articles lubricated using the lubricating composition of the invention as well as the use of the lubricating composition of the invention for lubricating various articles.

More particularly, the invention relates to:

an expandable rubber bladder coated on its outer surface with a composition according to the invention, for shaping and curing pneumatic or semipneumatic tires;

an expandable rubber bladder which can be obtained by heating the expandable bladder defined above, in particular at 80–150° C. (preferably 100–150° C.) so as to ensure complete crosslinklng of the crosslinkable constituents of the emulsion;

a raw pneumatic or semipneumatic tire comprising elements which will constitute its outer tire tread intended to come into contact with the ground, coated on its inner surface with a composition according to the invention;

the use of a lubricating composition according to the invention during the shaping and curing of pneumatic or semipneumatic tires, for the lubrication of the expandable rubber curing bladder.

The lubricating composition of the invention may be applied in any manner, and for example by spraying, brushing or alternatively using a sponge or a brush. It is preferable to carry out the operation so as to cover the article to be coated with a regular layer of coating.

The lubrication of the curing bladder used during the curing of pneumatic or semipneumatic tires may be carried out in two different ways.

During the manufacture of pneumatic or semipneumatic tires, a raw tire is placed in a tire mold, an expandable bladder is placed in the mold, the mold is closed and the bladder is expanded by applying an inner pressure of hot fluid, such that the tire becomes flattened against the mold, shaped and cured. The mold is then opened, the bladder is deflated and the tire is recovered, shaped and cured. The same bladder is used for the manufacture of about a thousand tires.

The expandable rubber bladder used during the manufacture of the tires is initially coated with a composition according to the invention.

At the start, the lubrication of the bladder is direct. Next, the lubricating effect of this bladder is depleted.

In this subsequent phase, it is the inner surface of the tire (that which comes into contact with the bladder) which is coated with the lubricating composition. There is regeneration of the lubrication of the rubber bladder by transfer from the tire.

In general, the mold pressing/bladder release cycles used during the manufacture of the tires are in the following succession:

the bladder, initially coated with the lubricating composition (direct lubrication) and heated at 80–150° C. is used without subsequent coating for 5 to 10 cycles (each cycle resulting in the manufacture of a different tire), and then the next cycles are carried out using this same bladder (for which the lubrication coating has been depleted) starting with pneumatic or semipneumatic tires each time coated with the lubricating composition of the invention: the lubrication of the bladder occurs in this case by transfer.

The lubricating composition of the invention comprises no constituent with an Si—H bond, such that the risk of emission of hydrogen during storage or transport is zero.

The lubricating composition of the invention has, in addition, excellent sliding and durability properties.

The following examples which illustrate the invention demonstrate the excellent lubricating properties of the compositions of the invention.

EXAMPLE 1

This example illustrates a lubricating composition according to the invention comprising a water-soluble crosslinking agent (constituent (g)).

The formulation of this composition, which is an oil-in-water emulsion, is given in the table below.

TABLE 1

| Nature of the constituent | Identification | Percentage by weight in the emulsion |
|---|---|---|
| Linear polydimethylsiloxane with a $(CH_3)_3SiO_{1/2}$ terminus having a dynamic viscosity equal to $10^{-1}$ Pa.s at 25° C. | Constituent (a) | 39.92 |
| MDT-OH resin[1] | Constituent (b) | 5.71 |
| Methyltriethoxysilane | Constituent (c) | 0.38 |
| Dioctyltin dilaurate emulsion[2] | Constituent (d) | 0.24 |
| Polyethoxylated isotridecyl alcohol[3] | Constituent (e) | 2.71 |
| $NH_2$—$(CH_3)_3$—$Si(OH)_3$[4] | Constituent (g) | 2.42 |
| Antifoaming agent | | 0.20 |
| Antioxidant | | 0.05 |
| Bactericide | | 0.02 |
| Thickener (xanthan gum) | | 0.11 |
| Wetting agents | | 0.30 |
| Distilled water | | 47.94 |
| | | 100 |

[1]MDT resin having a hydroxylation level of 0.5% by weight, an average number per molecule of organic radicals for a silicon atom of 1.5, a dynamic viscosity at 25° C. of 0.1 Pa.s and the following proportions of siloxyl units:
M: 17 mol %
D: 26 mol %
T: 57 mol %.
[2]Dioctyltin dilaurate emulsion at 37.5% by weight in water prepared using polyvinyl alcohol as surfactant.
[3]Mixture of 15% water and 85% isotridecyl alcohol ethoxylated with 8 to 9 mol of ethylene oxide per mol of isotridecyl alcohol.
[4]Aqueous solution containing 23% by weight of silane.

The lubricating composition of table 1 was prepared in two steps.

Step 1

A mixture composed of nonreactive polydimethylsiloxane of low viscosity, MDT-OH resin, methyltriethoxysilane, surfactant and a portion of distilled water (in a water/surfactant ratio of 1.2) is homogenized beforehand, with moderate stirring for 15 minutes at room temperature.

The mixture thus obtained is treated by grinding until phase inversion is obtained using a Moritz® grinder, in order to pass from a water/oil fluid phase to an oil/water thick phase.

The dilution of the thick phase obtained is carried out with average stirring in 40 minutes, using a determined quantity of distilled water in order to obtain an emulsion whose dry matter content is 40%. The bactericidal agent and the antioxidant are added during the dilution. The silane (g) and the catalyst are added at the end of dilution, homogenization with moderate stirring is carried out for 10 minutes, followed by filtration.

Step 2

The remaining quantity of water is loaded into a separate container, the biocide, the antifoam and the wetting agent are added thereto and the content of this container is stirred for 10 minutes. Xanthan gum and another wetting agent are loaded into another container, mixed for 10 minutes with vigorous stirring, and then added to the container containing the water, the biocide and the antifoam. The mixture thus prepared is added to the emulsion prepared in step 1. The mixture is further stirred, at moderate speed, for 30 minutes.

The emulsion obtained is characterized by a mean particle size of 0.388 μm and a proportion of dry matter (60 min, 120° C.) of 48.8% by weight.

EXAMPLE 2

This example illustrates a lubricating composition identical to that of example 1, but prepared from a more viscous constituent (a), namely a linear polydimethylsiloxane with a $(CH_3)_3SiO_{1/2}$ terminus having a dynamic viscosity equal to 1. Pa.s at 25° C.

The emulsion obtained is characterized by a mean particle size of 0.402 μm and a proportion of dry matter (60 min, 120° C.) of 48.5% by-weight.

EXAMPLE 3

This example illustrates a lubricating composition similar to that of example 1 but comprising, in addition, a film-forming polymer in aqueous dispersion (styrene-acrylic latex).

The formulation of this composition is given in table 2.

TABLE 2

| Nature of the constituent | Identification | Percentage by weight in the emulsion |
|---|---|---|
| Polydimethylsiloxane of example 1 | Constituent (a) | 36.57 |
| MDT-OH resin of example 1 | Constituent (b) | 5.23 |
| Methyltriethoxysilane | Constituent (c) | 0.35 |
| Dioctyltin dilaurate emulsion of example 1 | Constituent (d) | 0.22 |
| Polyethoxylated isotridecyl alcohol of example 1 | Constituent (e) | 2.48 |
| $NH_2$—$(CH_2)_3$—$Si(OH)_3$ of example 1 | Constituent (g) | 2.22 |
| Styrene-acrylic latex[1] | | 7.28 |
| Antifoaming agent | | 0.19 |
| Antioxidant | | 0.05 |
| Bactericide | | 0.02 |
| Thickener (xanthan gum) | | 0.10 |
| Wetting agents (xanthan gum) | | 0.28 |
| Distilled water | | 45.01 |

[1]Aqueous dispersion; dry extract = 50%; pH = 8; Brookfield RVT viscosity at 50 revolutions/min = 800 mPa.s; mean particle diameter = 0.1 μm; minimal temperature for forming film = 0° C.

This composition is prepared as in example 1, the aqueous dispersion of the film-forming polymer being added at the end of the second step, after which the emulsion is maintained, with stirring, for an additional 30 minutes.

The emulsion obtained is characterized by a mean particle size of 0.385 μm and a proportion of dry matter (60 min, 120° C.) of 49.1% by weight.

EXAMPLE 4

The composition of this example is identical to that of example 3, except that the styrene-acrylic latex is replaced by an emulsion containing 50% by weight of a reactive α,ω-dihydroxypolydimethylsiloxane oil having a dynamic viscosity of 135 Pa.s at 25° C., said emulsion being prepared from a nonionic surfactant which is the polyethoxylated isotridecyl alcohol of example 1.

The method of preparing this composition is the same as in example 3, the latex being replaced by the reactive oil.

The emulsion obtained is characterized by a mean particle size of 0.400 μm and a proportion of dry matter (60 min, 120° C.) of 49.0% by weight.

The properties of the compositions of examples 1 to 4 were measured by evaluation of the coefficients of friction and of the durability.

A low coefficient of friction reflects good sliding properties.

The tests for measuring the coefficients of friction and the durability were adapted to the application of the lubricating composition onto an expandable rubber bladder.

Sliding Test

The objective of this test is to assess the sliding power of a lubricating composition placed at the interface between the expandable bladder and the inner surface of the envelope of a pneumatic tire.

This test is carried out by causing a metal block of defined weight, under which a film of pneumatic tire envelope (50×75 mm) is attached, to slide over a rubber surface, whose composition is that of the expandable bladder.

The surface of the expandable bladder is treated beforehand with the lubricating composition according to a procedure similar to that used in production.

The coefficient of friction is measured using a tensiometer (at the speed of 50 mm/min). Five successive passes are made on the same expandable bladder sample, changing the pneumatic tire envelope sample each time.

The lower the values of the coefficient of friction and the better the sliding properties of the lubricating composition will be.

The five passes give information on the depletion of the lubricating composition during successive moldings.

This sliding test is perfectly representative of the performances to be achieved on an industrial tool; it is a first selection criterion.

Durability Test

The durability of a lubricating composition corresponds to the number of pneumatic tires produced without degrading the surface of the expandable bladder. A film of expandable bladder, treated beforehand with the lubricating composition to be evaluated, is pressed into contact with a film of uncured pneumatic envelope, according to a series of pressure and temperature cycles simulating the steps of manufacture of a pneumatic tire on an industrial tool.

The pneumatic envelope film is replaced at each molding. The test is completed when the two surfaces in contact remain attached. The lubricating composition at the surface of the film of the expandable bladder is depleted and no longer plays the role of lubricating interface.

Table 4 below presents the coefficients of friction obtained at each pass for each of the compositions of examples 1 to 4. By way of comparison, the performances of the composition of the example described in FR 2 494 294, whose composition is indicated in table 3, were also evaluated.

TABLE 3

| (comparative example) | |
| --- | --- |
| Composition of FR 2 494 294 | Parts by weight |
| Polydimethylsiloxane containing hydroxyl terminal groups | 40.4 |
| Methylhydrogensiloxane (at 30%) | 175.0 |
| Zinc acetate/stearate (at 20%) | 43.7 |
| Antifoaming agent | 1.3 |
| Water | 610.8 |

TABLE 4

| | | Ex. 1 | Ex. 2 | Ex. 3 | Ex. 4 | Comp. ex. |
| --- | --- | --- | --- | --- | --- | --- |
| Coefficient of friction | 1st pass | 0.0752 | 0.0765 | 0.0810 | 0.0895 | 0.0933 |
| | 2nd pass | 0.1138 | 0.0862 | 0.1100 | 0.1194 | 0.1400 |
| | 3rd pass | 0.1312 | 0.0936 | 0.1550 | 0.1648 | 0.1800 |
| | 4th pass | 0.1571 | 0.1419 | 0.2100 | 0.2200 | 0.2316 |
| | 5th pass | 0.1710 | 0.2494 | 0.2820 | 0.2900 | 0.3400 |

It is clearly evident from table 4 that the coefficients of friction measured in the case of the comparative example are higher than those measured in the case of each of the compositions of the invention.

Table 5 presents the durability of the compositions of examples 1 to 4 of the invention as well as that of the comparative example.

TABLE 5

| Example | Durability |
| --- | --- |
| Example 1 | 10 |
| Example 2 | 12 |
| Example 3 | 9 |
| Example 4 | 9 |
| Comparative example | 8 |

EXAMPLE 5

This example illustrates a composition according to the invention comprising neither reactive oil (h) nor water-soluble crosslinking agent (g). The formulation of the lubricating composition is presented in table 6.

TABLE 6

| Nature of the constituent | Identification | Percentage by weight in the emulsion |
| --- | --- | --- |
| Polydimethylsiloxane of example 2 | Constituent (a) | 41.167 |
| MDT-OH resin of example 1 | Constituent (b) | 5.885 |
| Methyltriethoxysilane | Constituent (c) | 0.389 |
| Dioctyltin dilaurate emulsion of example 1 | Constituent (d) | 0.25 |
| Polyethoxylated isotridecyl alcohol of example 1 | Constituent (e) | 2.793 |
| Bactericide | | 0.0199 |
| Antioxidant | | 0.0498 |
| Distilled water | | 49.446 |

This emulsion is prepared using the method of example 1, except that after the dilution, in step 1, only the emulsion of tin salt is added.

The quantities of distilled water which are successively added in the first step (before inversion, and then for the dilution) are 2.424 and 47.02% by weight, respectively.

The emulsion obtained is characterized by:

a mean particle size of 0.405 μm;

a proportion of dry matter (60 min, 120° C.) of 48.5% by weight;

a coefficient of friction 0.1849;

a durability of 4.

EXAMPLE 6

This example illustrates a composition which is identical to that of example 5, except that it comprises a water-soluble crosslinking agent (g).

The formulation of the lubricating composition is the following:

TABLE 7

| Nature of the constituent | Identification | Percentage by weight in the emulsion |
|---|---|---|
| Polydimethylsiloxane of example 2 | Constituent (a) | 40.135 |
| MDT-OH resin of example 1 | Constituent (b) | 5.737 |
| Methyltriethoxysilane | Constituent (c) | 0.379 |
| Dioctyltin dilaurate emulsion of example 1 | Constituent (d) | 0.25 |
| Polyethoxylated isotridecyl alcohol of example 1 | Constituent (e) | 2.723 |
| $NH_2$—$(CH_2)_3$—$Si(OH)_3$ of example 1 | Constituent (g) | 2.5 |
| Bactericide | | 0.0194 |
| Antioxidant | | 0.0486 |
| Distilled water | | 48.207 |

This composition is prepared using a method similar to that of example 1. The quantities of water respectively added in step 1 (before inversion, and then for the dilution) are 2.37% by weight and 45.84% by weight, respectively, the percentages being calculated relative to the total weight of the ingredients.

The characteristics of the lubricating composition are:

a mean particle size of 0.405 µm;

a proportion of dry matter (60 min, 120° C.) of 48.6%;

a coefficient of friction of 0.1808;

a durability 8.

It is observed, by comparison with the coefficients of friction and the durability of the compositions of examples 5 and 6, that the presence of a water-soluble crosslinking agent enhances the sliding and, to a lesser degree, durability properties.

What is claimed is:

1. A lubricating composition, in the form of an oil-in-water emulsion, based on siloxane and not emitting hydrogen, comprising:

a) a polydiorganosiloxane oil which is nonreactive to the lubricating properties, having a dynamic viscosity of the order of $5 \times 10^{-2}$ to $30 \times 10^{-2}$ Pa.s at 25° C.

b) a polyorganosiloxane resin carrying, before emulsification, condensable hydroxyl substituents and comprising, before emulsification, at least two different siloxyl units selected from the group consisting of formula $(R_O)_3SiO_{1/2}(M)$; $(R_O)_2SiO_{2/2}(D)$; $R_OSiO_{3/4}(T)$ and $SiO_{4/2}(Q)$, at least one of these units being a T or Q unit, in which formulae $R_O$ represents a monovalent organic substituent, the average number per molecule of organic radicals $R_O$ for a silicon atom being between 1 and 2; and said resin having a weight content of hydroxyl substituents of between 0.1 and 10% by weight;

c) a crosslinking agent which is soluble in the silicone phase, comprising at least two functional groups capable of reacting with the polyorganosiloxane resin (b);

d) a condensation catalyst capable of catalyzing the reaction of constituent (b) with constituent (c);

e) a surfactant; and f) water, said composition comprising
    from 5 to 95 parts by weight of constituent (a);
    from 0.5 to 50 parts by weight of constituent (b);
    from 0.1 to 20 parts by weight of constituent (c);
    from 0.05 to 10 parts by weight of constituent (d); per 100 parts by weight of the sum of constituents (a)+(b)+(c)+(d);

the quantities of surfactants and water being sufficient to obtain an oil-in-water emulsion.

2. The composition as claimed in claim 1, wherein the catalyst (d) is a tin-based catalyst.

3. The composition as claimed in claim 2, wherein the catalyst (d) is a dialkyltin dicarboxylate.

4. The composition as claimed in claim 1, wherein the constituent (c) is selected from the group consisting of organotrialkoxysilanes, organotriacyloxysilanes, organotrioximosilanes and tetraalkyl silicates.

5. The composition as claimed in claim 4, wherein the constituent (c) is an alkyltrialkoxysilane of formula $YSiZ_3$ in which Y is alkyl, and Z is alkoxy.

6. The composition as claimed in claim 1, wherein the constituent (a) is a linear polydiorganosiloxane comprising recurring units of formula $(R)_3SiO_{2/2}$, terminated at its chain ends by $(R)_3SiO_{1/2}$ units, in which R is a monovalent organic group selected from the group consisting of alkyl, alkenyl, aryl, cycloalkyl, cycloalkenyl, aralkyl and alkaryl.

7. The composition as claimed in claim 6, wherein the constituent (a) is a polydimethylsiloxane.

8. The composition as claimed in claim 1, wherein the resin (b) is a hydroxylated resin DT or MDT comprising at least 20% by weight of T units and having a weight content of hydroxyl groups ranging from 0.1 to 10%.

9. The composition as claimed in claim 1, wherein the resin (b) has a dynamic viscosity at 25° C. of between 0.2 and 200 Pa.s.

10. The composition as claimed in claim 1, which comprises in addition (g) from 0.5 to 15 parts by weight per hundred parts by weight of the sum of the constituents (a)+(b)+(c)+(d)+(g), of a water-soluble crosslinking agent comprising hydroxylated silanes and/or polydiorganosiloxanes (POSs), said crosslinking agent carrying at least one organic group with an Fr functional group, Fr being selected from the group consisting of optionally substituted amino functional groups, epoxy, optionally substituted acroyl ($CH_2$=$CH$—$CO$) optionally substituted methacroyl ($CH_2$=$C$ ($CH_3$)—$CO$—), optionally substituted ureido ($NH_2$—$CO$—$NH$—), optionally substituted thiol and halogen functional groups.

11. The composition as claimed in claim 10, wherein the constituent (g) has the formula $R_2R_1N$—$R_a$—$Si(OH)_3$ in which $R_a$ represents alkylene and $R_1$ and $R_2$ represent a hydrogen atom or an alkyl group.

12. The composition as claimed in claim 1, which comprises in addition at least (h) a reactive linear polydiorganosiloxane oil having per molecule at least two OH groups, said polydiorganosiloxane having a dynamic viscosity at 25° C. of between $5 \times 10^{-2}$ and $30 \times 10^{-2}$ Pa.s.

13. The composition as claimed in claim 12, wherein said constituent (h) has the formula:

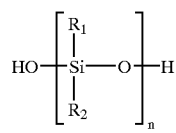

in which n is an integer greater than or equal to 10, $R_1$ and $R_2$, which are identical or different, represent —OH, alkyl, cycloalkyl, alkenyl, cycloalkenyl or amino.

14. The composition as claimed in claim 1, which comprises in addition a film-forming polymer and a styrene-acrylic copolymer.

15. The composition as claimed in claim 1, which comprises-from 40 to 95% by weight of water.

16. The composition as claimed in claim 1, which comprises from 0.5 to 10% by weight of surfactant.

17. A method for preparing a lubricating composition as claimed in claim 1, comprising the steps comprising:

α-emulsifying in water (f), a mixture of nonreactive polydiorganosiloxane oil (a), polyorganosiloxane resin (b), and crosslinking agent which is soluble in the silicone phase (c), in the presence of the surfactant (e) so as to prepare an oil-in-water type emulsion; and β-adding to the preceding emulsion, an emulsion of the catalyst (d) in water.

18. The method as claimed in claim 17, which comprises, in addition, after carrying out step β, the addition, to the resulting emulsion, of an aqueous emulsion of a reactive linear polydiorganosiloxane oil (h).

19. The method as claimed in claim 17, which comprises, in addition, after carrying out step α, the addition of an aqueous solution of a water-soluble crosslinking agent.

20. An article coated with a composition as claimed in claim 1.

21. An article which can be obtained by heating an article as claimed in claim 20.

22. An expandable rubber bladder coated on its outer surface with a composition as claimed in claim 1, for shaping and curing pneumatic and semipneumatic tires.

23. An expandable rubber bladder which can be obtained by heating a bladder as claimed in claim 22 to a temperature of 80 to 150° C.

24. A raw pneumatic or semipneumatic tire comprising elements which will constitute its outer tire tread intended to come into contact with the ground, coated on its inner surface with a composition as claimed in claim 1.

25. A method of lubricating an article, the method comprising lubricating the article with a lubricating composition as claimed in claim 1 for the lubrication of an article.

26. A method of lubricating an expandable curing rubber bladder of a pneumatic or semipneumatic tire, the method comprising lubricating the expandable curing bladder using a lubricating composition as claimed in claim 1 during the shaping and curing of the pneumatic or semipneumatic tire.

* * * * *